US006439893B1

(12) United States Patent
Byrd et al.

(10) Patent No.: US 6,439,893 B1
(45) Date of Patent: Aug. 27, 2002

(54) WEB BASED, ON-LINE SYSTEM AND METHOD FOR ASSESSING, MONITORING AND MODIFYING BEHAVIORAL CHARACTERISTIC

(76) Inventors: Jacqueline Byrd, 8732 Walton Pond Cir., Bloomington, MN (US) 55438; Kevin Nickels, 8732 Walton Pond Cir., Bloomington, MN (US) 55438

( * ) Notice: Subject to any disclaimer, the term of this patent is extended or adjusted under 35 U.S.C. 154(b) by 0 days.

(21) Appl. No.: 09/636,120

(22) Filed: Aug. 10, 2000

(51) Int. Cl.[7] .............................................. G09B 19/00
(52) U.S. Cl. ........................... 434/236; 434/262; 482/8; 482/9; 482/901; 482/902
(58) Field of Search ................. 434/236, 262; 482/8, 9, 901–902

(56) References Cited

U.S. PATENT DOCUMENTS

| | | | | | |
|---|---|---|---|---|---|
| 5,368,546 A | | 11/1994 | Stark et al. | | |
| 5,722,418 A | * | 3/1998 | Bro | ........................ | 600/545 X |
| 5,810,605 A | * | 9/1998 | Siefert | .................... | 434/362 X |
| 5,908,301 A | * | 6/1999 | Lutz | ...................... | 434/236 X |
| 5,954,510 A | * | 9/1999 | Merrill et al. | .......... | 434/236 X |
| 5,961,332 A | * | 10/1999 | Joao | ...................... | 434/236 X |
| 5,967,789 A | * | 10/1999 | Segel et al. | ............. | 434/236 X |
| 6,159,131 A | * | 12/2000 | Pfeffer | ........................... | 482/8 |
| 6,167,362 A | * | 12/2000 | Brown et al. | ............. | 703/11 X |
| 6,210,272 B1 | * | 4/2001 | Brown | ...................... | 463/1 X |

* cited by examiner

Primary Examiner—Joe H. Cheng
Assistant Examiner—Chanda Harris
(74) Attorney, Agent, or Firm—Merchant & Gould P.C.

(57) ABSTRACT

A system and method for interactively assessing at least one characteristic of a user on-line, developing a personal growth strategy and monitoring the person's progress with respect to the personal growth strategy.

12 Claims, 4 Drawing Sheets

WEB BASED, ON-LINE SYSTEM AND METHOD FOR ASSESSING, MONITORING AND MODIFYING BEHAVIORAL CHARACTERISTIC

FIELD OF THE INVENTION

The present invention is directed to a system and method of assesing, monitoring and modifying at least one characteristic of a user on-line, and, more particularly, to a system and method that interactively monitors, and coaches a user in developing and achieving a personal growth plan, as well as a system and method that interacts with a user to assist the user in maintaining activities that foster personal growth either in the abstract or in accordance with a personal growth plan.

BACKGROUND OF THE INVENTION

Various tools or inventories have been developed to determine behavioral characteristics. The term "characteristic" refers to a variety of things that may be referred to as a profile or style, such as a person's creativity, analytical ability, risk taking level, etc. These tools are helpful in making a person aware of particular strengths and weaknesses associated with the determined characteristic. Organizations, such as an employer, also find such tools helpful in assessing characteristics of particular individuals that can affect the way those individuals contribute to the success of the organization. In addition, such tools can be helpful in determining what characteristics are desired in order to achieve success for a particular individual or organization.

An example of such a tool is a Creatrix Inventory developed by the Richard Byrd Company. The Creatrix Inventory is designed to help people identify their levels of creativity, i.e., the degree to which they can produce unconventional ideas, as well as their assertion toward risk taking, i.e., high, moderate or low.

The Creatrix Inventory consists of multiple statements to which an individual responds by indicating his or her degree of agreement or disagreement with the statement. Half of these statements are based on literature about risk taking, and half are based on literature about creativity. After an individual completes the inventory, he or she scores it according to the directions provided and then plots the scores on a matrix called the Creatrix. The vertical scale of this matrix designates the degree to which the respondent is a risk taker; the horizontal scale designates the degree of the respondent's creative abilities.

The Creatrix is divided into eight zones, each of which represents a creativity/risk-taking orientation: Sustainer, Modifier, Challenger, Practicalizer, Innovator, Synthesizer, Dreamer, and Planner. These different orientations can be useful in understanding the differences among people within work groups. For example, when group members discuss the impact of their different orientations on planning, decision making, and problem solving, they can develop a clearer perception of the group's resources. Identifying orientations also can be helpful in career-counseling and career-development efforts, in team building, enhancing one's self-understanding and in changing an entire organization's culture. Of course, other types of inventories exist to measure other characteristics of a person or organization.

Typically these kinds of tools are applied manually with an administer handing out individual forms that need to be filled out, scored, and returned. With the advent of computers and the Internet, it is desirable to replace the paper and pen method with a computerized one.

A system has been designed where an individual can access the Creatrix Inventory over the Internet and take the inventory. After the user takes the inventory, information about that user's behavioral characteristic is displayed to the user based on the information supplied by the individual.

Often, however, finding out about one's behavioral characteristic is only the first step. Often an individual desires to have a different characteristic, i.e. a targeted characteristic, that may have certain strengths the user desires or lacks certain weakness that may be present in the user's current characteristic. It would be desirable to provide assistance to the user, particularly over the Internet, to interactively develop and monitor a personal growth plan for that individual. Also, it is desirable to interactively provide the user with a selection of aides that are tailored to allow the user to achieve the targeted profile. In addition, it is desirable to provide interactive feedback to a user's selection of aides that may assist in achieving the plan. And finally, it is desirable to provide the user with motivational aides that assist the user to perform activities that are beneficial to that user's personal growth.

SUMMARY OF THE INVENTION

According to a first aspect of the invention, there is provided a method of interactively assessing a user's current profile and developing a personal growth strategy on-line to achieve a target profile. The method includes the steps of:
(a) electronically displaying an inventory questionnaire to a user via a display unit;
(b) electronically receiving inputs from the user regarding the inventory questionnaire;
(c) electronically generating a growth strategy matrix based on the inputs received from the user wherein the growth strategy matrix reflects the user's current profile; and
(d) electronically receiving input from the user regarding the targeted profile the user wishes to adopt.

In addition, the method also includes the step of electronically generating options from which the user can select at least one of a plurality of aids to assist the user in achieving the targeted profile.

According to a second aspect of the invention, there is provided a system for interactively assessing a user's current profile and developing a personal growth strategy on-line to achieve a target profile. The system includes:
a computing device; and
a computer program comprising one or more program modules executable by the computing device wherein the program module comprises;
a module for displaying an inventory questionnaire to a user via a display unit;
a module for receving inputs from the user regarding the inventory questionnaire;
a module of generating a growth strategy matrix based on inputs received from the user wherein the growth strategy matrix reflects the user's current profile;
a module for receiving input from the user regarding the targeted profile the user wishes to adopt; and
a module for generating options from which the user can select at least one of a plurality of aids to assist the user in achieving the targeted profile.

According to a third aspect of the invention, there is provided a computer-readable medium having computer-executable instructions for carrying out the inventive method.

According to a fourth aspect of the invention, there is provided a computer data signal embodied in a carrier wave readable by a computing system and encoding a computer program of instructions for executing a computer process performing the inventive method.

DETAILED DESCRIPTION OF THE PREFERRED EMBODIMENTS

Figure 1:
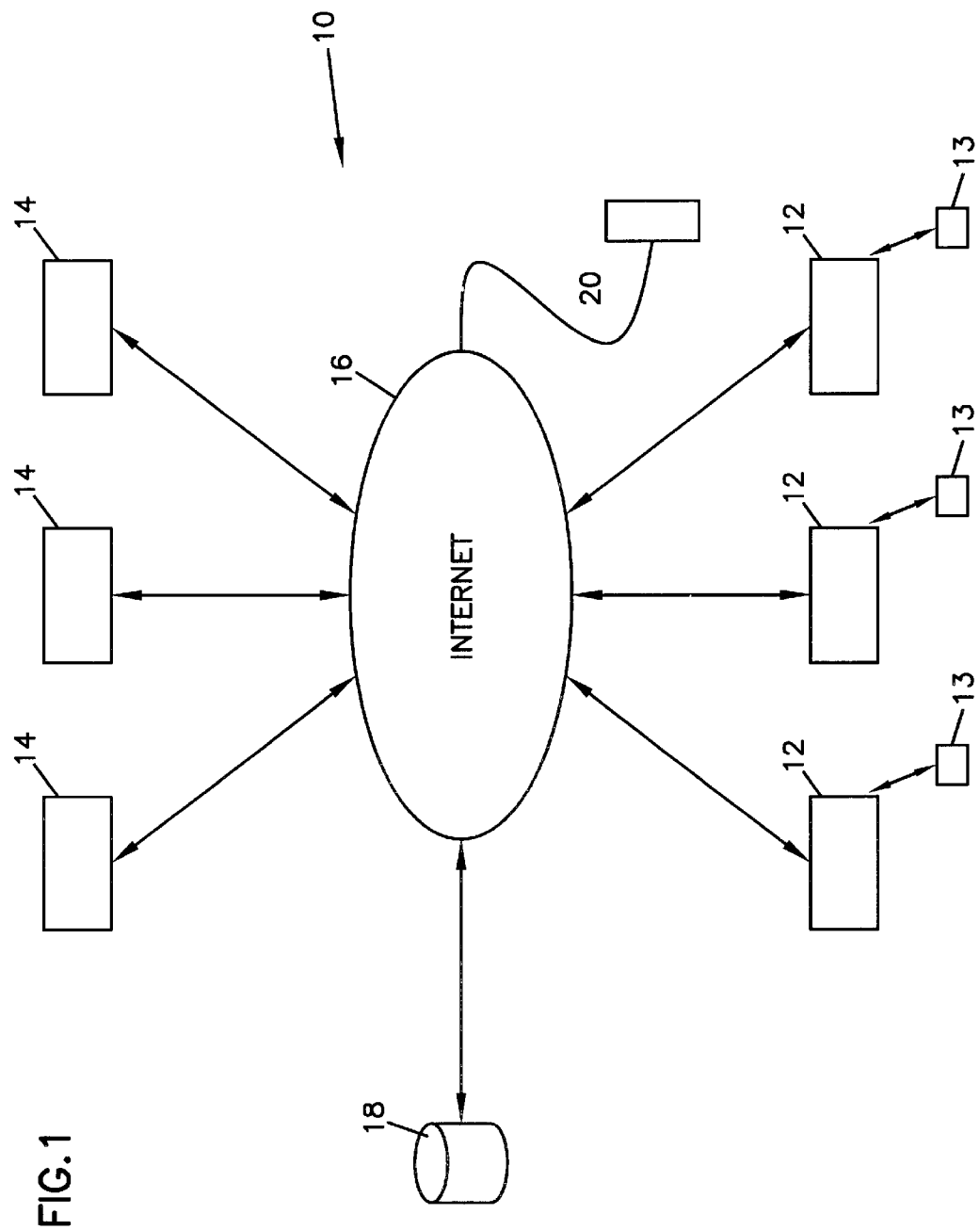
FIG. 1 is a schematic of a system and method for interactively assessing at least one characteristic of an individual's personality, interactively developing a personal growth plan and monitoring the individual's progress along the plan.

FIG. 1 is a schematic of a system and method for interactively assessing at least one characteristic of an individual's personality, developing a personal growth plan and monitoring the individual's progress along that plan. As previously mentioned, the term "characteristic" can refer to a variety of things, such as a person's creativity, analytical ability, etc. In the illustrative examples that will be described, two characteristics are assessed, a person's creativity and a person's level of risk taking. It is to be understood that the present invention is not limited to a particular tool but rather is directed to affecting behavioral changes of any type such as weight loss, quit smoking or assertiveness training, for example.

The system 10 includes a plurality of users 12 preferably located at computer terminals, a plurality of coaches 14 preferably located at computer terminals that are located remotely from the user, at least one database 18 and a communication infrastructure 16 for interconnecting all of these elements. Preferably the communication infrastructure 16 is the Internet although other infrastructures may be used such as private networks, intranets, ethernets, etc. Preferably, the computer terminals utilized by the users 12 and coaches 14 may have video conferencing capability so that interactive real time communication can be established between a user and a coach. Alternatively, the communication between a user and coach can be established over a voice line and still, alternatively, the communication may not be real-time but, instead, established through messages typed at the keyboards of the computer terminals.

In addition, the user may be equipped with a smart device 13 that provides prompts to motivate the user to initiate an activity. The smart device 13 may be coupled to a user's terminal 12 or it may be a standalone device or it may be coupled to telecommunication lines. The smart device 13 may also measure a user's compliance with respect to activities forming part of that user's personal growth plan or with respect to suggested activities. The smart device 13 is preferably designed to catch the user's attention. For example, the smart device 13 may be a CDROM that when loaded in the user's terminal 12 displays prompts on the screen that attract the user's attention. For example, the smart device 13 could be a program that when the user logs onto his or her terminal, or whatever frequency is desired, the user is faced with a prompt perhaps suggesting an activity the e user should undertake and the user must respond to that prompt, for example by typing a response. The smart device downloads the response to a database which can then be used to monitor the user's compliance. For example, a lawyer may be prompted to make sure his or her time sheet from the previous day has been completed. In addition, if a personal growth plan has been devised using the present invention which will be described in detail hereinafter, the user may receive messages that require the user to respond to his or her progress. For example, if a part of the personal growth plan is to read a certain book, some designated period of time later, the user may be prompted as to whether he or she has completed the task of reading that book. The user would respond and data stored in the database concerning the user's progress would be updated.

Figure 2:
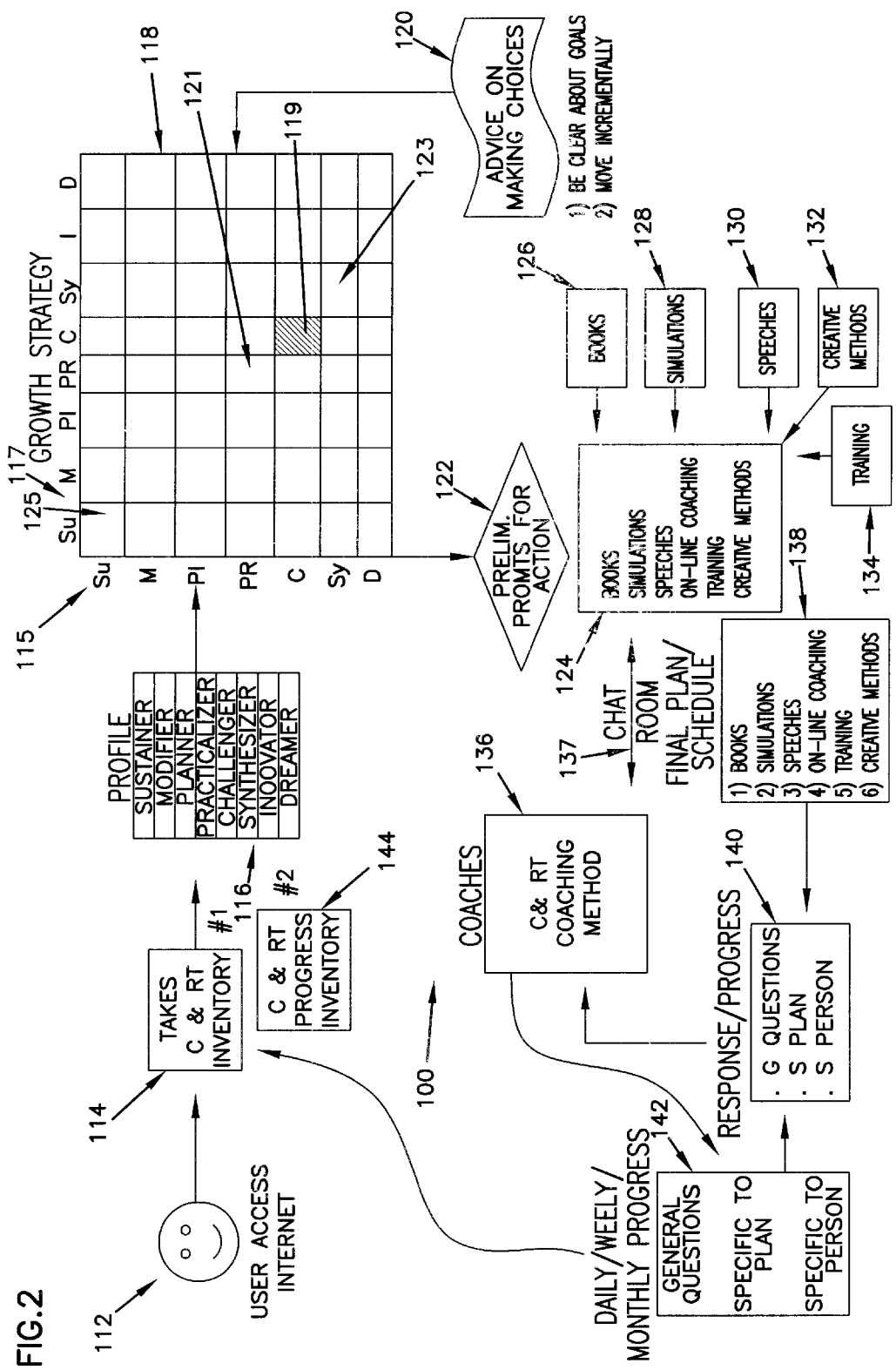
FIG. 2 is a detailed schematic of the flow of communication between a user and a counselor using the system shown in FIG. 1.

FIG. 2 is a detailed schematic of the flow of communication between a user and coach using the system shown in FIG. 1. As previously mentioned, the method 100 preferably utilizes the Internet as a communication vehicle between the individual users and the coaches. In a preferred embodiment, a user 112 logs onto a website which supports the method 100 of the present invention. Various security measures can be taken such as providing the user with a password and logon name. After logging on, the user is presented with the option of taking an inventory 114. If a user has already taken an inventory and a personal growth plan has been created, then the user may be presented with an additional option of measuring his or her progress. In this preferred embodiment, the inventory is a Creatrix Inventory although the present invention is not limited to a particular inventory.

The Creatrix Inventory 114 presents a plurality of items or statements that the individual must rate on a scale ranging from complete disagreement to complete agreement. The user preferably uses the keyboard (not shown) associated with the user's terminal to respond to each item. Alternatively, other forms of responses may be used such as voice activated responses or touch screen inputs may be accepted. After the user rates each item of the inventory, the ratings are tallied and a score is calculated. Preferably the method of the invention resides in software stored at a site such as a server 20 (see FIG. 1) coupled to the communication infrastructure 16. The software has the appropriate algorithms to compute the score from the user's responses. Based upon the score, a profile 116 is assigned. In a preferred embodiment, one of the following profiles 116 may be assigned: sustainer, modifier, planner, practicalizer, challenger, synthesizer, innovator or dreamer. Each profile has a different level of risk taking and creativity associated therewith. From the assigned profile, a matrix 118 is displayed on the display associated with the user's terminal. The matrix 118 is a growth strategy matrix which has the various profiles plotted on the vertical 115 and horizontal axes 117. The user's current profile is indicated where that profile intersects along the horizontal and vertical axes as shown at 119.

In this particular example, the user scored as having a "challenger" behavioral characteristic. The matrix also shows where the other profiles fall with respect to one another on the matrix. This is helpful to give the user an idea of what is a reasonable target profile in view of the user's current profile. For example, a user may find out that his or her current profile is that of a challenger 119. The user may not like the fact that a hindrance associated with the challenger profile is that they may destroy where destruction is not necessary. From the chart the user can see that with some work, he or she could become a practicalizer 121 or synthesizer 123. If the user wanted to become a sustainer 125 that would be an unrealistic goal since it is very remote from the user's current profile 119. The user is prompted with a preliminary prompt 122 to make a selection of a different profile. Thus, if a user did make a selection that was not realistic, he or she would be prompted with advice 120 on making realistic choices, i.e., be clear about goals and move incrementally. Otherwise, the user's response would be accepted. The advice 20 may come from a live person who is displayed to the user through a web camera, for example. Thus, a user's current profile may be that of a challenger 119 and with help from advice, a growth plan can be devised to change the current profile to that of a practicalizer 121, for example.

Once the target profile 121 is selected, a personal growth plan needs to be created to help the user achieve the targeted profile. A host of appropriate aides 124 are presented to the user for selection. The selection of aides displayed to the user is unique for that particular user since the aides are selected based upon the user's current characteristic. Preferably, the host of aides 124 are presented at the user's computer terminal display. The host of aides 124 available may include books 126, simulations 128, speeches 130, creative methods 132, training 134 as well as on-line coaching 136, for example. In a preferred embodiment, a chat room 137 is provided that allows the user to log onto an on-line coaching room. In that coaching room the user can chat on-line with a coach about the user's selections. From the interchange between the user and coach, a final plan/schedule 138 is created listing the aides the user should use to achieve his or her targeted profile. Alternatively, a user may communicate with a coach in a non-real-time environment. For example, the user may post a request or question, the coach would respond and such a communication would continue in a post, response, post format. This final plan/schedule 138 is stored in a memory such as database 18 and each time the user logs on, the final plan/schedule for that user is retrieved.

It is not only important to assess at least one characteristic of the user and develop a personal growth strategy for that individual, it is also important to monitor the user's progress in achieving the user's targeted profile. In order to do that, a progress inventory is also provided. More specifically, when the user logs onto the website he or she is presented with the option of either taking the program inventory 114 or monitoring their progress 144, assuming they have already taken the initial inventory. Preferably the user is presented with this dual option only after he or she has completed the inventory a first time and has made progress in his/her development. More preferably, the user and coach agree upon the progress made before the user is allowed to take a second inventory. Thus, until the user has taken an inventory, he or she will only be presented with the option to take the inventory.

If the user selects the second option 144, i.e., monitoring his or her progress, the user's final plan/schedule 138 is retrieved and presented to a coach 136. The coach and user are preferably chatting on-line in the chat room 137. The coach can ask the user general questions 140, questions specific to the user's plan and/or questions specific to that user. The coach creates a progress report 142 based on the answers provided and updates the progress inventory. The progress report can be updated daily, weekly or monthly depending on the frequency the user accesses the website to monitor his or her progress.

A progress report 144 is developed and displayed to the user. The progress report may include suggestions for achieving the user's personal growth plan. Periodically the user can retake the inventory to see if their profile has changed to the targeted profile thereby indicating whether the user has succeeded or not. If the user has succeeded, the user may want to select a new profile as a target profile and have a new personal growth profile developed to assist the user in achieving that new target profile.

In addition, as previously mentioned, the system and method of the present invention may also be equipped with a smart device that provides motivational prompts to a user to initiate an activity as well as monitors the user's compliance either with the developed personal growth plan of with suggested activities. For example, the smart device could be a microprocessor that is programmed to interact with a user at a selected frequency. The provider that manages the system and method of the present invention can program and manage the smart device either on-line or, if the smart device is a standalone device, the provider can send the code on physical medium such as a diskette or CDROM to the user who can then load it into the smart device.

Figure 4:
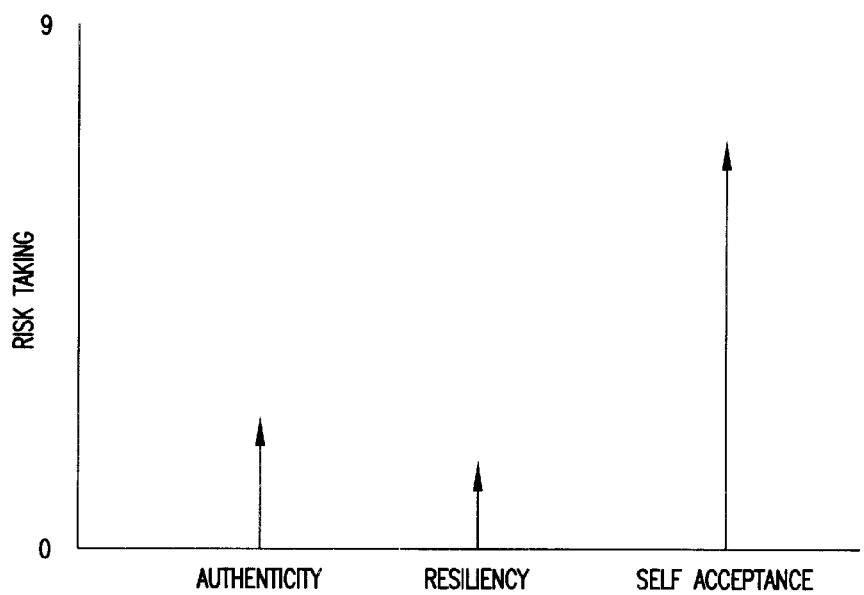
FIG. 4 is a graph of risk taking ability versus several categories.
Figure 5:
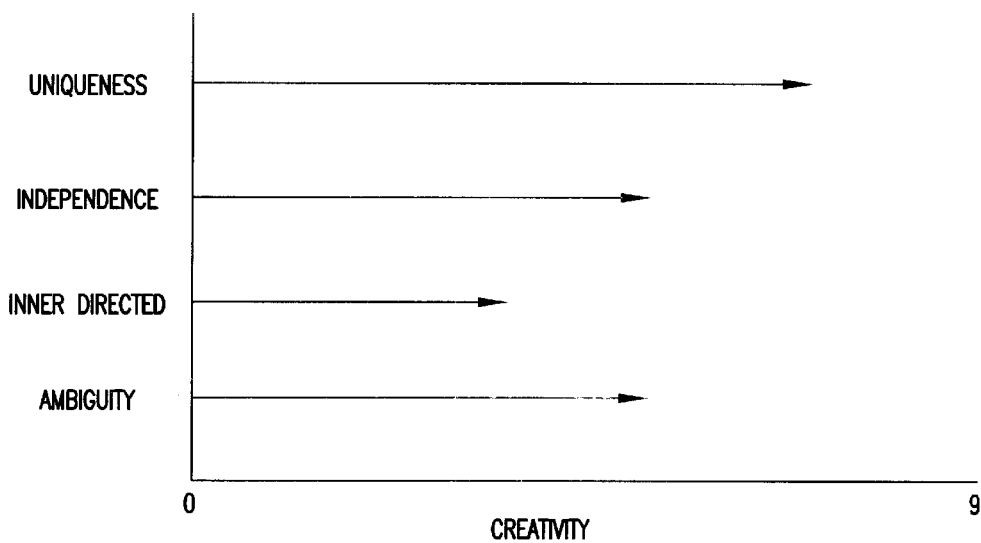
FIG. 5 is a graph of creativity versus several categories.

The smart device may be programmed with prompts that are related to the developed personal growth plan for a particular user. Alternatively, the smart device can be programmed to prompt the user regarding other issues. FIG. 4 is a graph of a user's risk taking level versus several categories namely authenticity, resiliency and self-acceptance. FIG. 5 is a graph of a user's creativity versus several categories, namely uniqueness, independence, inner-directedness and ambiguity. The smart device can be programmed to monitor any one or all of these categories. Thus, the user may be prompted with a question that is designed to measure that user's level of self-acceptance. The user would respond to that prompt and that response would be stored in a database. The smart device can be programmed so that it can monitor the user's compliance by prompting the user at a desired frequency, i.e. daily, weekly, monthly, etc.

The smart device can be any medium on which a signal can be displayed. In addition, the smart device can be an electronic or optical device which is activated by a signal to provide a prompt to a user.

Figure 3:
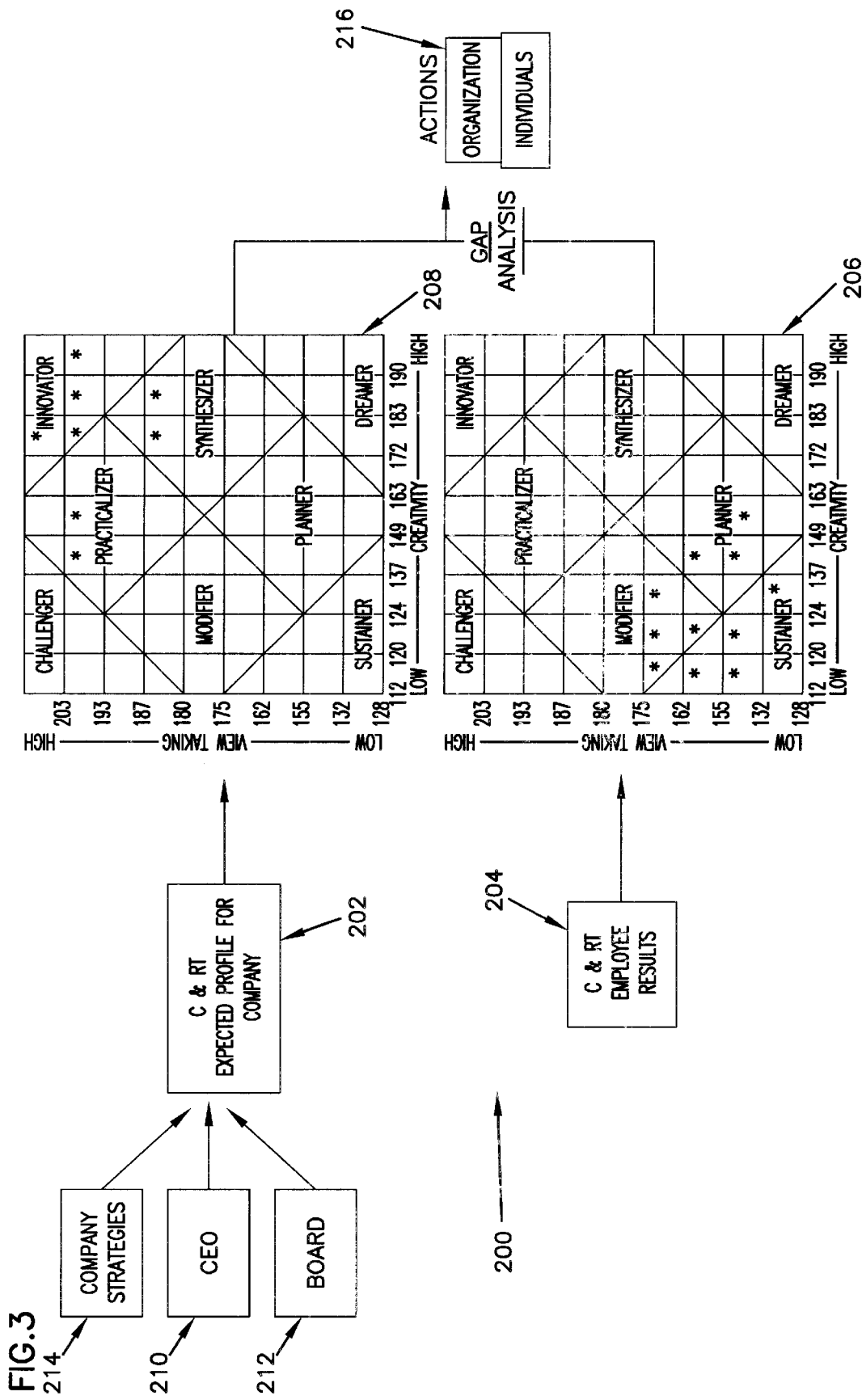
FIG. 3 is a schematic of a system and method for assessing any gaps between a company's expected profile and its employees' results.

FIG. 3 is a schematic of a system and method 200 for assessing gaps between a company's expected profile 202 and its actual profile 204. This process is helpful to measure a company's expectations versus its resources. As previously described, an employee can log onto a website and take an inventory. The employee's current profile is mapped against a graph 206 of creativity versus risk taking. Thus, as described previously, the employee is assigned one of a plurality of profiles. Simultaneously or at a separate time, an expected profile graph 208 is generated for the company. For example, a chief executive officer 210 may envision the company that is predominately one of a challenger and the profiles of the individuals within the company is that of a planner, there is an obvious gap. In addition, others within the company such as a board 212 or individuals responsible for company strategies 214 may define the expected profile the company by taking the inventory. An analysis of the gap is performed and a company growth profile, similar to a user's is developed. Steps similar to those performed with the individual as shown in FIG. 2 are applicable to the company scenario described with respect to FIG. 3.

The above specification, examples and data provide a complete description of the manufacture and use of the invention. Since many embodiments of the invention can be made without departing from the spirit and scope of the invention, the invention resides in the claims hereinafter appended.

What is claimed is:

1. A method of interactively assessing a user's current profile and developing a personal growth strategy on-line to achieve a target profile, the method comprising the steps of:

(a) electronically displaying an inventory questionnaire to a user via a display unit;

(b) electronically receiving inputs from the user regarding the inventory questionnaire;

(c) electronically generating a growth strategy matrix based on the inputs received from the user wherein the growth strategy matrix reflects the user's current profile; and (d) electronically receiving input from the user regarding the targeted profile the user wishes to adopt.

2. The method of claim 1 further comprising a step (e) of electronically generating options from which the user can select at least one of a plurality of aids to assist the user in achieving the targeted profile.

3. The method of claim 1 further comprising a step (f) of electronically dispensing advice to the user if the input received in step (d) is unrealistic.

4. The method of claim 1 further comprising steps of:

(f) coupling the user with a counselor in real-time wherein the counselor and user can discuss the user's progress.

5. The method of claim 4 further comprising a step of:

(g) generating a progress report based on the discussions had in step (f).

6. The method of claim 5 further comprising a step of:

(h) displaying to the user the progress report generated in step (g).

7. A system for interactively assessing a user's current profile and developing a personal growth strategy on-line to achieve a target profile, the system comprising:

a computing device; and a computer program comprising one or more program modules executable by the computing device wherein the program module comprise;

a module for displaying an inventory questionnaire to a user via a display unit;

a module for receiving inputs from the user regarding the inventory questionnaire;

a module for generating a growth strategy matrix based on inputs received from the user wherein the growth strategy matrix reflects the user's current profile;

a module for receiving input from the user regarding the targeted profile the user wishes to adopt; and a module for generating options from which the user can select at least one of a plurality of aids to assist the user in achieving the targeted profile.

8. A computer-readable medium having computer-executable instructions for the method recited in claim 1.

9. A computer data signal embodied in a carrier wave readable by a computing system and encoding a computer program of instructions for executing a computer process performing the method recited in claim 1.

10. A system for interactively assessing a user's current profile and developing a personal growth strategy on-line to achieve a target profile, the system comprising:

(a) means for displaying an inventory questionnaire to a user via a display unit;

(b) means for receiving inputs from the user regarding the inventory questionnaire;

(c) means for generating a growth strategy matrix based on the inputs received from the user wherein the growth strategy matrix reflects the user's current profile;

(d) means for receiving input from the user regarding the targeted profile the user wishes to adopt; and (e) means for generating options form which the user can select at least one of a plurality of aids to assist the user in achieving the targeted profile.

11. A computer usable medium having computer readable program code means embodied therein for causing an interactive on-line session between a user and a coach, the computer readable program code means in said computer program product comprising:

computer readable program code means for causing a computer to display of an inventory questionnaire to a user via a display unit;

computer readable program code means for causing a computer to receive inputs from the user regarding the inventory questionnaire;

computer readable program code means for causing a computer to generate a growth strategy matrix based on inputs received from the user wherein the growth strategy matrix reflects the user's current profile;

computer readable program code means for causing a computer to receive input from the user regarding the targeted profile the user wishes to adopt; and computer readable program code means for causing a computer to generate options from which the user can select at least one of a plurality of aids to assist the user in achieving the targeted profile.

12. A system for interactively assessing a user's current profile and developing a personal growth strategy on-line to achieve a target profile, the system comprising:

a server coupled to a communication infrastructure; and a database coupled to the server, wherein the server is programmed to display an inventory questionnaire to a user via a display unit, receive inputs from the user regarding the inventory questionnaire, generate a growth strategy matrix based on the inputs received from the user wherein the growth strategy matrix reflects the user's current profile, receive input from the user regarding the targeted profile the user wishes to adopt, and generate options from which the user can select at least one of a plurality of aids to assist the user in achieving the targeted profile.

* * * * *

UNITED STATES PATENT AND TRADEMARK OFFICE
CERTIFICATE OF CORRECTION

PATENT NO.   : 6,439,893 B1
DATED        : August 27, 2002
INVENTOR(S)  : Byrd et al.

It is certified that error appears in the above-identified patent and that said Letters Patent is hereby corrected as shown below:

<u>Column 8,</u>
Line 15, "form" should read -- from --

Signed and Sealed this

Fourth Day of March, 2003

JAMES E. ROGAN
*Director of the United States Patent and Trademark Office*